(12) United States Patent
Ito (10) Patent No.: US 7,151,613 B1
(45) Date of Patent: Dec. 19, 2006

(54) PRINTER

(75) Inventor: Atsushi Ito, Itami (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/506,453

(22) Filed: Feb. 18, 2000

(30) Foreign Application Priority Data

Feb. 18, 1999 (JP) ................. 11-040015
Feb. 18, 1999 (JP) ................. 11-040022

(51) Int. Cl.
*G06F 3/12* (2006.01)
*G06K 15/00* (2006.01)

(52) U.S. Cl. ..................... 358/1.15; 358/1.14
(58) Field of Classification Search ........... 358/1.15, 358/1.16, 1.18, 1.4, 402, 401, 403; 355/202, 355/208, 209, 309; 271/288, 298; 270/52.01
See application file for complete search history.

(56) References Cited

U.S. PATENT DOCUMENTS 5,534,974 A * 7/1996 Hasegawa ............... 355/202
5,777,882 A * 7/1998 Salgado ............... 364/478.02

FOREIGN PATENT DOCUMENTS

| JP | 2249348 | 10/1990 |
|---|---|---|
| JP | 4-207540 | 7/1992 |
| JP | 4-207735 | 7/1992 |
| JP | 07-156461 A | 6/1995 |
| JP | 8-2790 | 1/1996 |
| JP | 8-2792 | 1/1996 |
| JP | 8-97996 | 4/1996 |
| JP | 8-198514 | 8/1996 |
| JP | 9-48165 | 2/1997 |
| JP | 9-314956 | 12/1997 |
| JP | 10136012 | 5/1998 |
| JP | 10-257230 | 9/1998 |
| JP | 10-257290 A | 9/1998 |
| JP | 10322384 | 12/1998 |
| JP | 2000329378 | 11/2000 |

* cited by examiner

*Primary Examiner*—Douglas Q. Tran
(74) *Attorney, Agent, or Firm*—Morrison & Foerster LLP (57) ABSTRACT

A printer (100) for printing based on a print job signal sent from a data processing device (200) registers print job signal sending sources and a message corresponding to each sending source in memory (111, 112). A controller (113) detects whether the sending source of a received print job signal is registered in memory. If the sending source is registered, a messaging unit (110, 111) outputs a corresponding message. Sending sources that are permitted to print can also be registered in memory (111, 112). In this case, the controller (113) detects whether the sending source of a received print job signal is registered in memory, and instructs the printer (110) to print only when the sending source is registered as permitted to print.

11 Claims, 13 Drawing Sheets

| Bin No. | User's name |
|---|---|
| 1 | A |
| 2 | B |
| 3 | C |
| 4 | D |
| 5 | E |

Fig.6

| User. | Sending source registration name | Message type |
|---|---|---|
| A | B | Audio2 |
|   | D | Display3 |
| B | D | Display1 |
| C | A | Display1 |
|   | B | Display2 |
|   | D | Display3 |

| User. | Sending source registration name |
|---|---|
| A | B<br>D<br>E |
| B | D |
| C | A<br>B<br>D<br>E |
| | |

PRINTER

BACKGROUND OF THE INVENTION

CROSS REFERENCE TO RELATED APPLICATIONS

This application is based on Japanese Patent Applications No. 11-40015 and No. 11-40022, both filed Feb. 18, 1999, in Japan, the disclosures of which are herein incorporated by reference.

1. Field of the Invention

The present invention relates to a printer, and relates more specifically to a printer whereby important printer output (a print job) will not become intermingled with and lost among other print jobs.

2. Description of Related Art

Computer networks in which a plurality of host computers are connected to share one or more printers over a network connection are common today. Any one of the host computers in such a printing system is thus able to send a print job signal to a networked printer so that the job will be executed.

One such system whereby a plurality of users share a single printer in a networked environment is taught in, for example, Japanese Patent Laid-Open Publication Nos. HEI 8-2790 and HEI 8-2792. If the printer in this disclosed printing system has a plurality of output bins, one output bin can be allocated to each user so that the bins are used similarly to individual mailboxes for collecting print-out from individual users. An advantage of this system is that the need for manual sorting is reduced.

A problem with this conventional printing system, however, is that when print job signals arrive at the printer from plural users, the printer can start printing unexpectedly. An unintended result of this is that an important print-out from an important user can become intermingled with and lost among other print-out, and the user does not realize until later that the important print-out has been completed.

In addition, print-out can be sent to the printer from unknown sources, much like electronic mail is often received from unknown senders. In addition, an unknown number of print-out can be sent to the printer from various sources. In both such cases important print-out can become mixed with other print-out, and thus go unnoticed.

SUMMARY OF THE INVENTION

An object of a printer according to the present invention is therefore to resolve this problem by preventing important print-out from becoming lost among other print-out.

A further object of the present invention is to provide a printer whereby print requests from unintended sources can be refused, thereby preventing important print-out from becoming intermingled with and lost among other print-out.

To achieve these objects, a printer according to a preferred embodiment of the present invention has memory for registering a sending source of a print job signal, and a message corresponding to the sending source; at least one printing unit for receiving a print job signal sent from at least one data processing device and containing sending source and output destination information for the print job signal, and printing based on the received print job signal; a controller for detecting a sending source corresponding to an output destination based on a received print job signal, and detecting whether the sending source has been registered in the memory; and a messaging unit for outputting a message corresponding to the sending source when the controller detects that the sending source has been registered.

By thus registering print job signal sending sources and a message to be presented for each sending source, a print job is executed when a print job signal is received, whether the sender is registered is detected from the print job signal, and an appropriate message is presented to the sender if the sender is registered.

This makes it possible to notify a user that a desired print job has been completed by presenting the message registered for that user simultaneously to completing printing. This is particularly useful when a user is waiting for a print job from a particular source, such as a particular person, and makes it possible to prevent an important print-out from becoming lost among other print-out.

The data processing device can be any type of device capable of processing a signal and outputting a print job signal, but is typically a host computer. There can also be a plurality of data processing devices. In addition, there can be one or a plurality of printers.

The data processing device(s) and printer(s) can also be connected in various ways, including via a network. While the printing unit will have at least one output bin, it can have a plurality of output bins. If it has a plurality of output bins, a particular user can be assigned to each of the plural output bins, and one or more sending sources and corresponding messages can be registered for each user. In this case, the output bins can be used similarly to a mailbox so that important print-out will not become mixed with other print-out.

To achieve this, the printer preferably has a plurality of output bins assigned to a plurality of users. The memory then registers for each user a sending source and message corresponding to each sending source. The printing unit outputs printed material to an output bin assigned to a user indicated by the output destination information in a received print job signal. The controller detects whether a sending source of the received print job is registered in memory as a sending source for the user indicated by the output destination information of the received print job signal.

In addition to print data and a print control signal, the print job signal must contain information indicating a sending source, and information for specifying a particular output bin to which the print job is to be deposited if the printer has a plurality of output bins.

Messages can be presented by an audible tone or voice announcement, or by text. The message can also include the sending source and the print job title. User convenience and benefit can be further improved by changing the message and presentation method according to the sending source.

The memory, controller, and messaging unit can be provided in the printer or the data processing device.

The present invention can also be achieved as a printing system comprising a plurality of data processing devices and printers.

A printing system according to the present invention thus comprises a plurality of data processing devices; a printer for printing based on a print job signal received from a data processing device and containing information indicating the sending source and output destination; memory for registering a sending source of a print job signals and a message corresponding to the sending source; a controller for detecting from the print job signal a sending source corresponding to an output destination, and detecting whether the sending source is registered in memory; and a messaging unit for outputting a message corresponding to the sending source when the controller detects that the sending source is registered in the memory.

The above-described process can be accomplished on a printing system by installing a software printer driver to a data processing device or printer.

The present invention therefore also provides a computer-readable data storage medium for storing a program for controlling a printing system. The program stored to this medium selects a message from among a plurality of messages pre-registered for a plurality of output destinations based on output destination information contained in a received print job signal; and outputs the selected message to the printing system.

When a print job signal is sent from a data processing device, the job is executed based on the print job signal. The sender is also confirmed so that if the sender is registered, an appropriate message can be presented.

If a user is waiting for a print-out from a particular person, it is therefore possible to notify the user simultaneously to completion of the print job that a print job has been received from the particular person so that the desired print-out will not become lost among other non-important print-out. It is therefore possible to prioritize print-out to be delivered to oneself by, for example, defining a list of one or more parties from whom an important document or correspondence is expected or desired.

Another preferred embodiment of a printer according to the present invention has memory for registering a sending source for each output destination of a print job sent from a data processing device that is permitted to print; a printing unit for printing based on a received print job; and a controller for confirming a sending source corresponding to an output destination based on a print job sent from the data processing device and containing sending source and output destination information, and detecting whether the sending source is registered in the memory. If the controller confirms that the sending source is registered in the memory, it instructs the printing unit to execute the print job.

With this embodiment of the present invention a user can create a list of sending sources that are permitted to print. Then when a print job signal is received, it can be determined whether the sender is registered in the list of permitted printer users based on the sending source information included with the print job signal so that the job can be executed if the sender has been registered as permitted to print. This makes it possible to prevent important documents from being lost among other print-out without allowing materials from unknown senders, such as direct mailers or prank mailers, to be printed.

It is also possible to simply delete without printing any print job received from a sending source that has not been registered. This can be accomplished by further providing a command unit for instructing the controller to delete a received print job when the controller detects that the sending source is not registered in the memory.

A further preferred embodiment of the present invention temporarily stores a received print job signal instead of immediately deleting it when the sending source is not registered for printing, and asks the output bin user to decide whether to print or delete the print job signal.

This can be accomplished by further providing a storage unit for storing a received print job when the controller detects that the sending source is not registered in the memory; a messaging unit for notifying a user that a print job has been received from a sending source that is not registered as being permitted to print; a printing unit for executing a print job stored to the storage unit in accordance with the user's printing instructions; and a command unit for instructing the controller to delete a print job stored to the storage unit in accordance with the user's deletion instructions.

This storage unit and the above-noted memory can be shared, but the storage unit is preferably a hard disk or similar auxiliary storage device. The messaging unit can use any means of signaling or sending a message to the user, including presenting a message on the user's display, lighting an indicator, or even emitting an audible tone or voice message. The printing unit can be the same printing unit for which sending sources are registered, or it can be a separate printing means.

In addition to print data and a print control signal, the print job signal must contain information indicating a sending source, and information for specifying a particular output bin to which the print-out is to be deposited if the printer has a plurality of output bins.

The memory, controller, command unit, storage unit, and messaging unit can be disposed in the printer, or in the data processing device, or in both the printer and data processing device as may be appropriate to the application.

The present invention can also be configured as a printing system.

More specifically, a printing system according to the present invention has multiple data processing devices; a printer for printing based on a print job signal sent from a data processing device and containing information indicative of a sending source; memory for registering a sending source for each output destination of a print job sent from a data processing device permitted to print; and a controller for confirming a sending source corresponding to an output destination based on a print job sent from a data processing device and containing sending source and output destination information, and detecting whether the sending source is registered in the memory. If the sending source is registered in the memory, the controller instructs the printer to print the print job.

The operation of the printing system as described above can also be expressed as a control process written as a software printer driver, which can be installed to a data processing device or printer to achieve the function of the printing system as described above.

In this case, a computer-readable storage medium for storing a program for controlling a printing system stores a program for execute a print job when the sending source information included with the print job to be executed is a sending source pre-registered as permitted to print to a corresponding output destination.

If the sending source of a print job has not been pre-registered as permitted to print, the program recorded to this storage medium can comprise a further means for deleting the print job.

Yet further, if the sending source of a print job has not been pre-registered as permitted to print, the program recorded to this storage medium can comprise a further means for notifying a user that a print job has been received from a sending source that is not permitted to print, and appropriately deleting the received print job in accordance with a deletion instruction from the user.

In any event, when a print job is sent from a data processing device, the sending source of the print job is confirmed and checked to determine whether the sending source is pre-registered. If the sending source is so registered, the print job is executed. It is therefore possible to accept print jobs only from pre-registered, that is, authorized, parties, and refuse print jobs from unknown parties, such as direct mailers and prank mailers.

In addition, by limiting print job sending sources that can print to a specifically defined list of one or more parties that are permitted to print, it is possible to prevent unwanted, wasteful printing. It is therefore possible to reduce printing costs.

Other objects and attainments together with a full understanding of the invention will become apparent and appreciated by referring to the following description and claims taken in conjunction with the accompanying drawings.

DETAILED DESCRIPTION OF THE PREFERRED EMBODIMENTS

The preferred embodiments of the present invention are described below with reference to the accompanying drawings.

Embodiment 1

Figure 1:
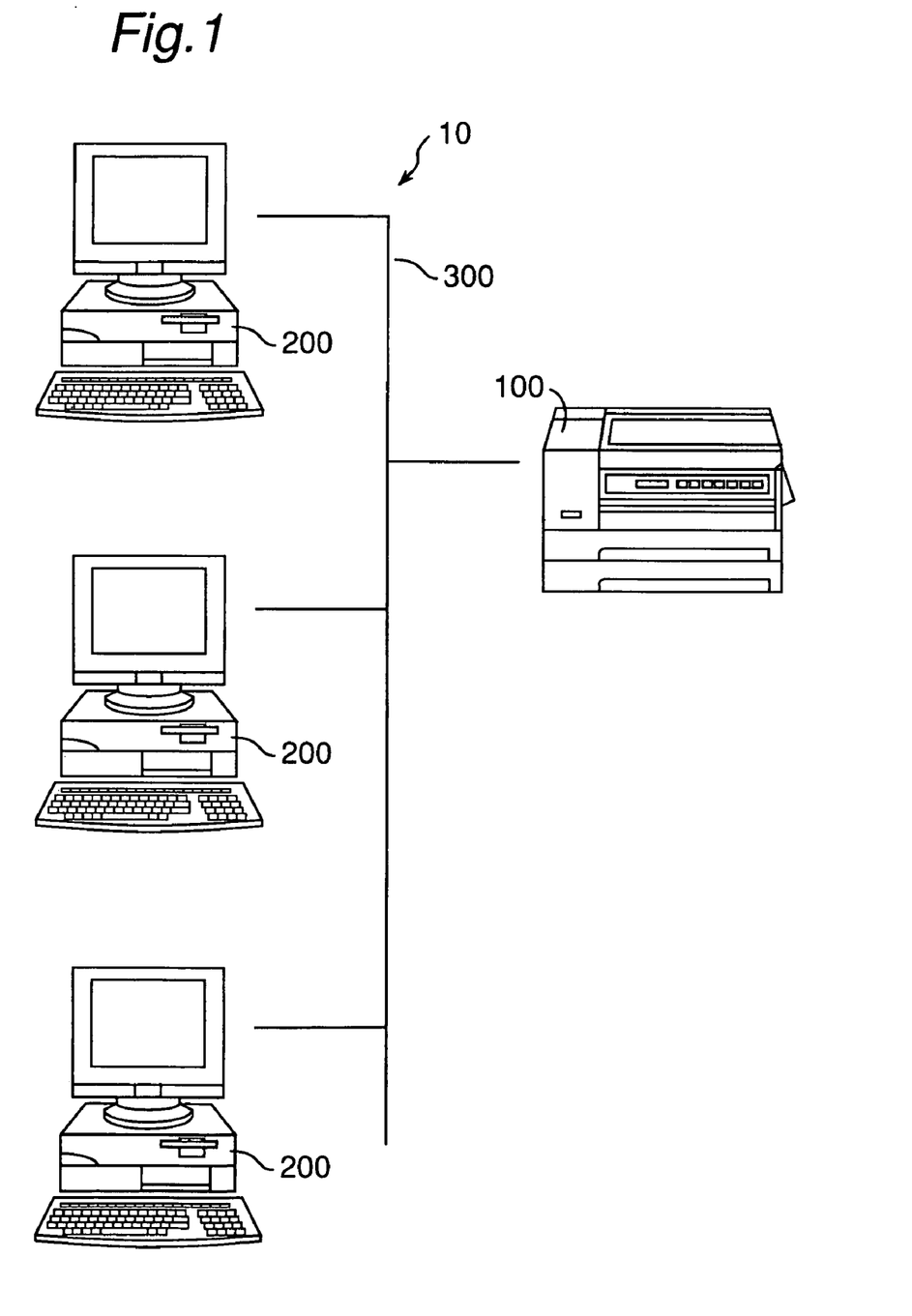
FIG. 1 shows a printing system according to a first embodiment of the present invention.

As shown in FIG. 1, a printing system 10 according to this preferred embodiment of the invention comprises a printer 100 connected to a plurality of host computers 200 by way of network 300 so that any of the host computers 200 can send a print job signal to the printer 100 for executing a print job on the printer 100.

Figure 2:
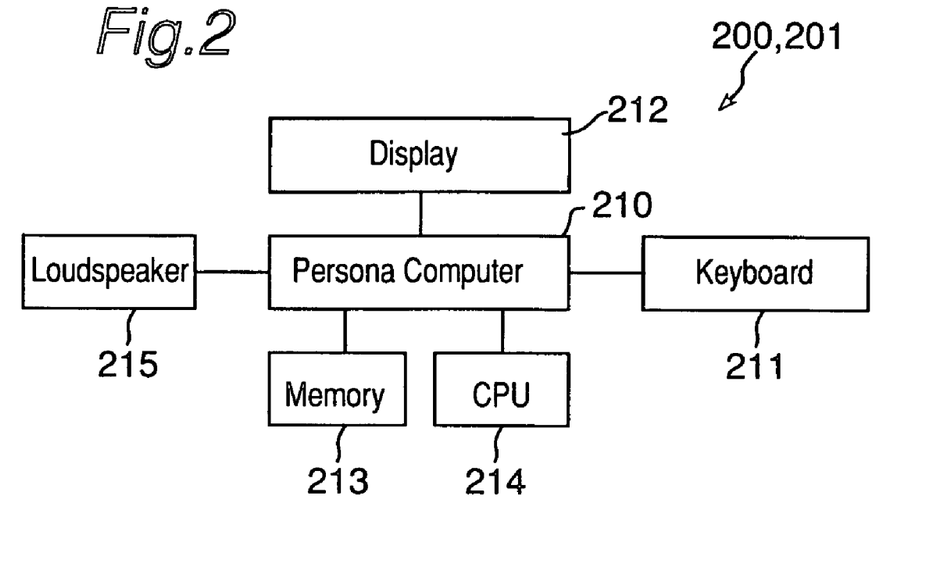
FIG. 2 is a functional block diagram of a host computer in the printing system shown in FIG. 1.

FIG. 2 is a functional block diagram of a host computer 200. Each host computer 200 comprises a personal computer 210, a keyboard 211 for data entry and controlling the personal computer 210, a display 212, storage 213 for storing content, a CPU 214 for data operations and processing, and a loudspeaker 215 for audio output.

Figure 3:
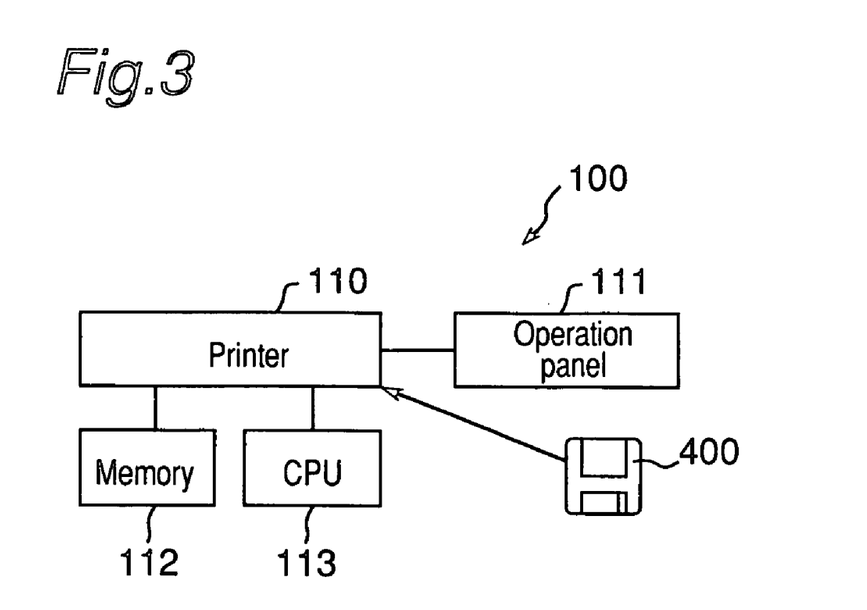
FIG. 3 is a functional block diagram of a printer in the printing system shown in FIG. 1.

As shown in FIG. 3, the printer 100 comprises a printing unit 110, operating panel 111 for entering and displaying various printer settings, memory 112 for storing content, and a CPU 113 for data operations and processing. A floppy disk 400 is used in this exemplary embodiment for storing software to be installed to the printer 100. The floppy disk 400 stores a program that is run by the printer 100 to accomplish the process further described below with reference to FIG. 10. This program is installed to the printer 100 so that the process shown in FIG. 10 can be accomplished on the printing system 10.

Figure 4A:
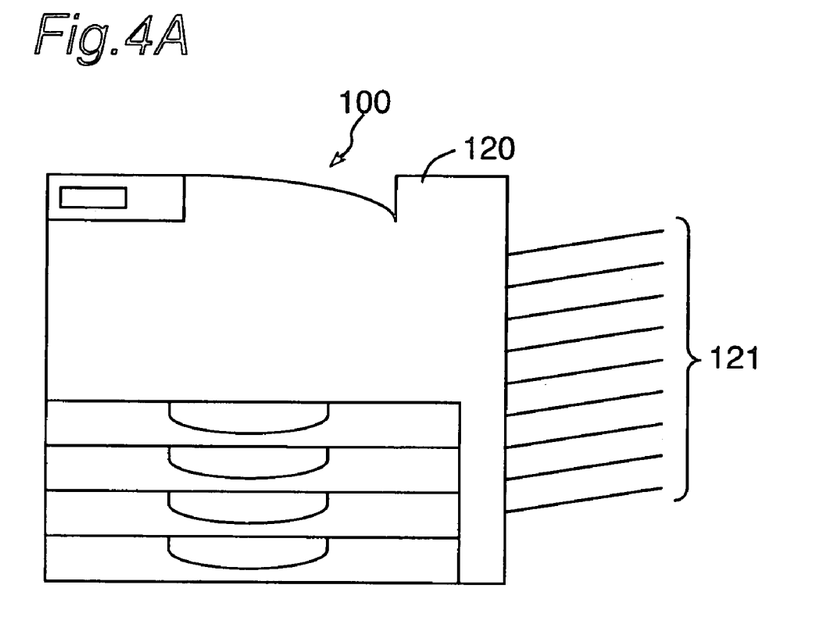
FIGS. 4A and 4B show the appearance and output bins of a printer in the printing system shown in FIG. 1.
Figure 4B:
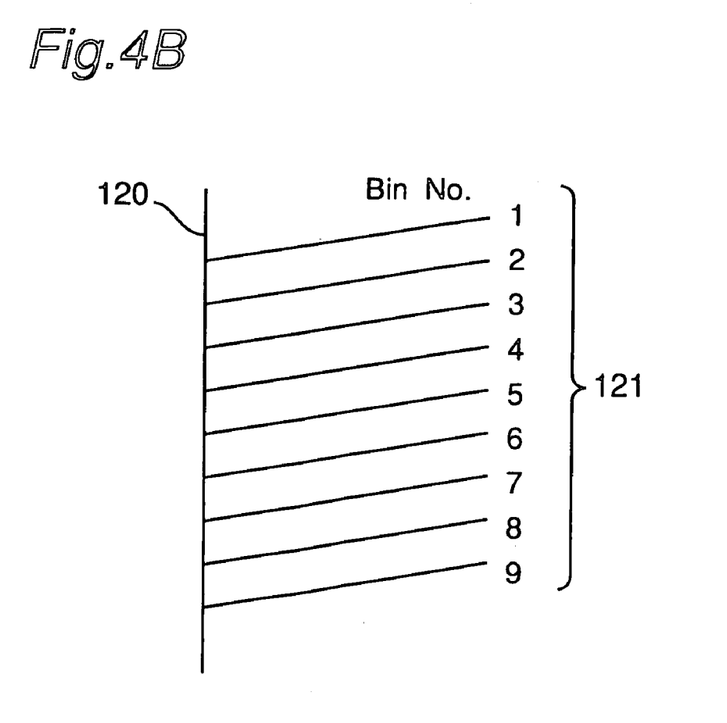
Figure 5:
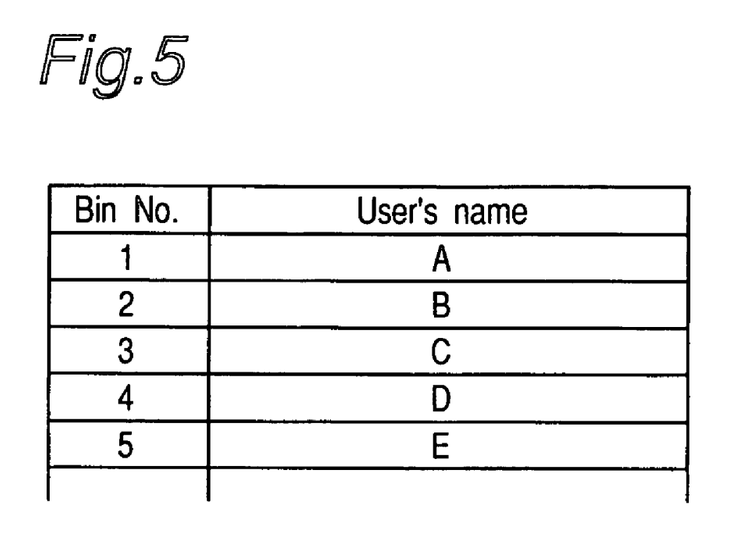
FIG. 5 shows an exemplary assignment of users to output bins of a printer in the printing system shown in FIG. 1.

FIG. 4A shows the typical appearance of a printer 100. This printer 100 has a plurality of output bins 121 disposed to the print unit 120 as shown in FIG. 4B. Each output bin 121 is further assigned a bin number as shown in FIG. 4B. FIG. 5 shows an exemplary assignment of printer users to each output bin 121 of printer 100. FIG. 5 shows the assignment of printer users A, B, C, D, and E to bin numbers 1, 2, 3, 4, and 5, respectively, only, but users can also be also similarly assigned to each of the other output bins 121. This assignment of printer users to output bins can be accomplished using the keyboard 211 of a host computer 200, or from the operating panel 111 of the printer 100. The assignment settings are then stored in memory 112 of printer 100.

Figure 6:
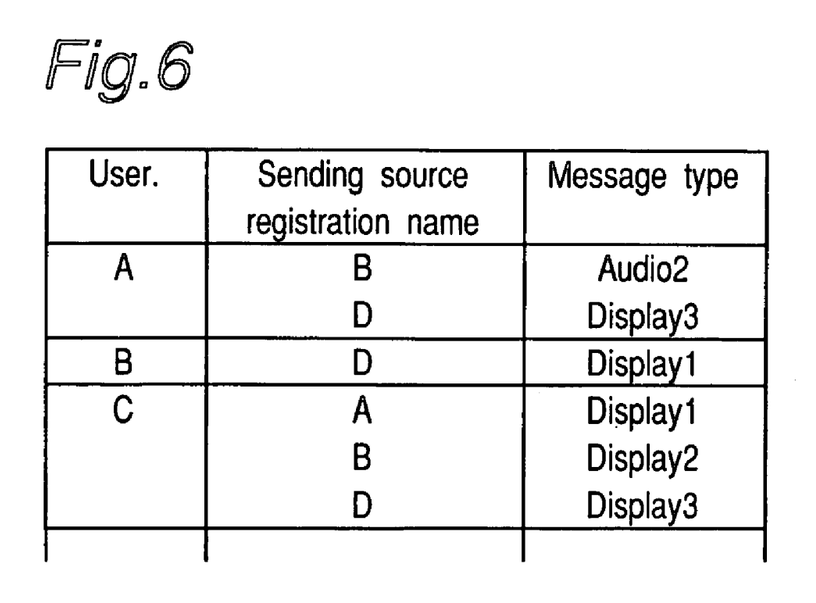
FIG. 6 shows a typical assignment of printer users and messaging methods for printer user registration names (registrants)

A sending source (sender) and a message presentation method and type can be further assigned for each printer user registration name (user) as shown in FIG. 6. As shown in FIG. 6, senders B and D are registered under user A with a message type of audio-2 presented for sender B and a message type of display-3 presented for sender D. Sender D is registered under user B with an assigned message type of display-1. Senders A, B, and D are assigned to user C with respective message type selections of display-1, display-2, and display-3. Senders and corresponding message presentation method and type can be similarly assigned for other users.

When a print job signal is sent from one of the senders thus registered in the printer set-up, the printer presents a message using the presentation method set for that sender. Available message types include an audible tone or signal, a voice message, and a visual display. Messages can be presented by way of, for example, a speaker, a dialog box presented on the user's display, by sending an e-mail message, or using a status monitor. These settings can be made using the keyboard 211 of a host computer 200, or from the operating panel 111 of the printer 100. The settings are then stored in memory 112 of printer 100.

It should be noted that a speaker is required if a message is presented using an audible tone or signal, or a voice message, but the printing unit 110 commonly has a built-in speaker for signaling the user, and this built-in speaker can be used so that a separate speaker is not needed.

When the printer 100 is configured as shown in FIG. 6 and a print job signal is sent from sender B registered under user A, the printer 100 uses the selected message type, that is, a voice message (audio-2 in FIG. 6), for notifications presented to the user, but when a print job signal arrives from sender D, the printer 100 presents messages via a dialog box (display-3 in FIG. 6). If a print job signal arrives from any other sender, no message is presented.

Figure 7:
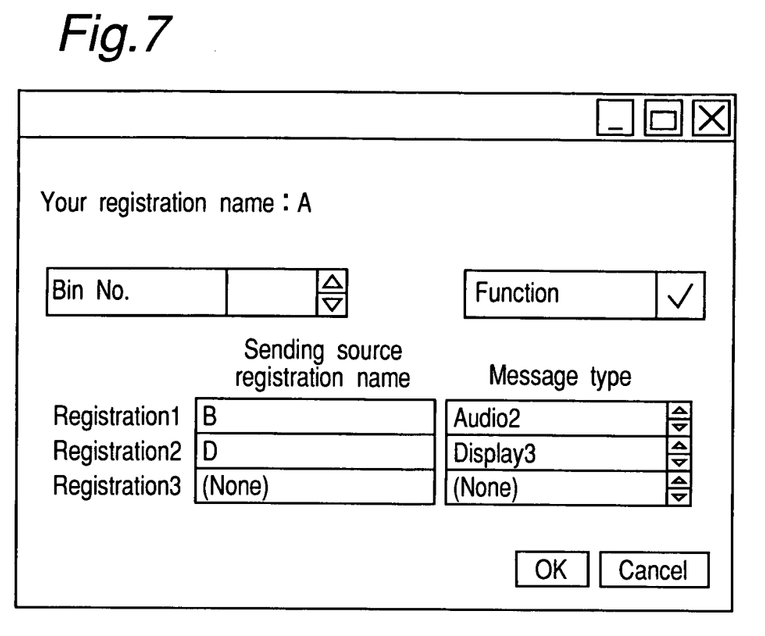
FIG. 7 shows one method for completing the setups shown in FIG. 5 and FIG. 6 on a host computer.

FIG. 7 shows an exemplary dialog box for assigning senders A to E to output bins 121 as shown in FIG. 5, and registering senders and message type information as shown in FIG. 6.

As shown in FIG. 7, the following settings are made for each printer user registration name assigned to a user, referred to herein as the user: a bin number for the output bin 121 to be used for outputting print jobs for any sender assigned to that user, and whether the user users the message presentation function. In addition, senders for whom a message is to be presented, and the method of presenting the message, are selected for each user.

As shown in FIG. 7, the settings for user A are: bin number 1; to use the message presentation function; to use the user A settings for senders B and D; and to present message type audio-2 for sender B and message type display-3 for sender D.

Figure 8:
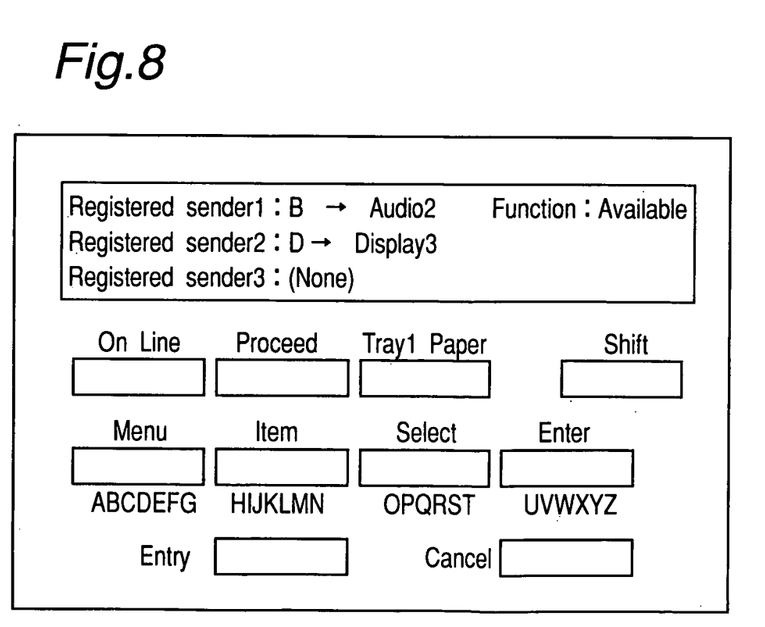
FIG. 8 shows one method for completing the setups shown in FIG. 5 and FIG. 6 on the printer.

FIG. 8 shows an exemplary operating panel 111 on the printer 100 used for assigning users A to E to output bins 121 as shown in FIG. 5, and registering senders and message type information as shown in FIG. 6. As with the example shown in FIG. 7, assigned for each particular user are: a bin number for the output bin 121 to be used; whether the message presentation function is used for that user; senders and the method of presenting messages for each sender. As shown in FIG. 8, the settings for registered sender 1 are sender B and audio-2; for registered sender 2 are sender D and display-3. The message presentation function is also enabled for the selected user. These settings can be made using the keys on the operating panel 111 individually or in combination.

Figure 9:
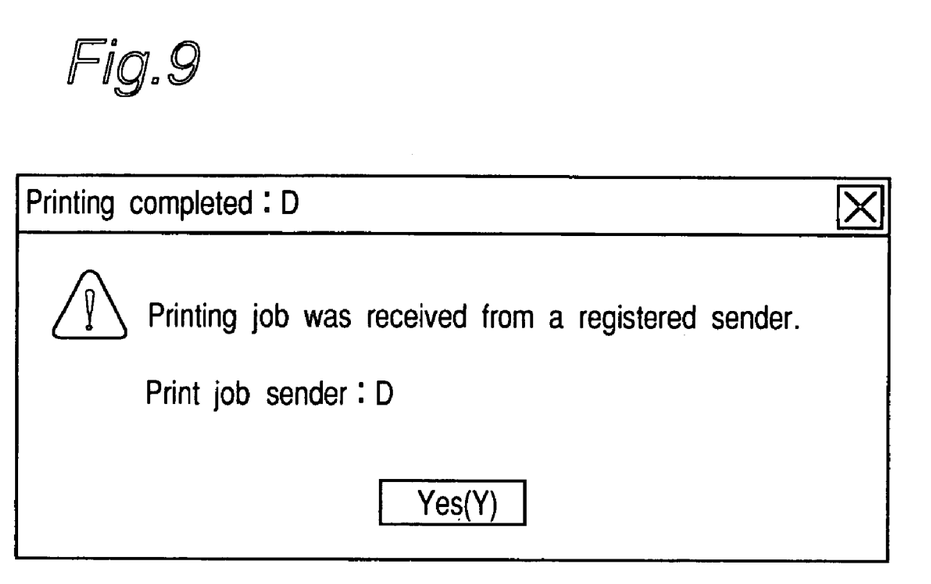
FIG. 9 shows an exemplary message presented after printing is completed.

FIG. 9 shows a typical message from the printer presented in a dialog box on the user's screen. As shown in FIG. 9 the printer reports:

Printing completed: D

A print job was received from a registered sender and has been completed.

Print job sender: D

It should be noted that the print job title can be alternatively or additionally displayed. This message is also displayed on the operating panel 111 of the printer 100.

Figure 10:
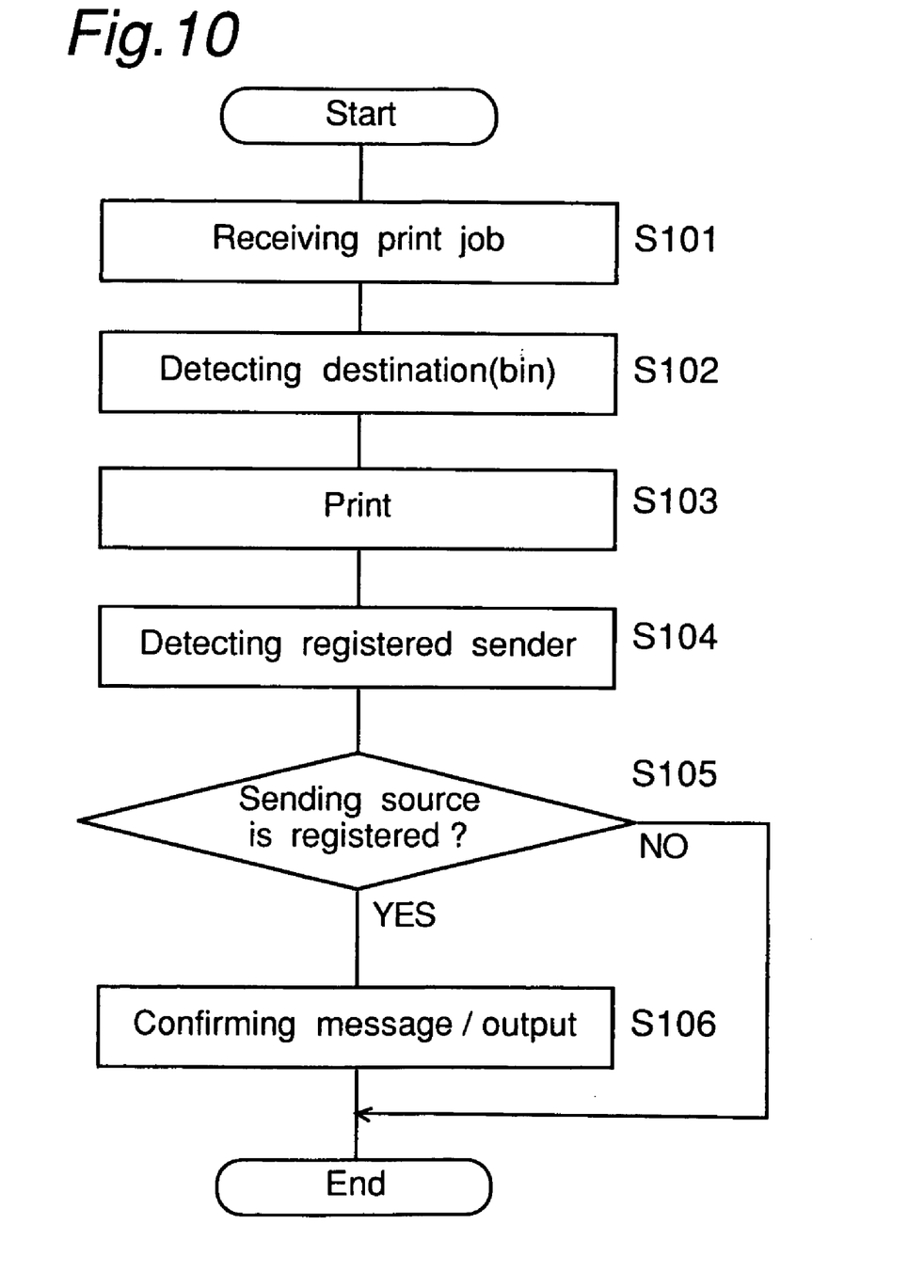
FIG. 10 is a flow chart of a printer control process according to the present invention.

FIG. 10 is a flow chart of a control process performed on the printer 100. When a print job signal is sent from a host computer 200 to the printer 100, the printer 100 receives the print job signal at step S101. In addition to print data and a printer control signal, the print job signal contains information indicative of the print job signal sender, and the bin number of the output bin 121 to which the job is to be deposited.

When a print job signal is received, the printer 100 detects the destination of the print job, that is, the bin number of the output bin 121 to which the job is to be deposited, from the received print job signal (step S102), and then prints the job based on the information in the print job signal and deposits it to the specified output bin 121 (step S103).

Next, the CPU 113 of the printer 100 detects the name of the print job signal sender (who sent the print job signal) detects whether the sender is included in the names of the registered senders by comparing the user name to whom the print job was addressed with the content of memory 112 (step S105). If registered, the printer 100 presents a message according to the setup registered for that sender (step S106). The process then ends. If the sender is not registered, the process ends with no message being presented. It should be noted that these message presentation steps can be processed before printing the job.

Figure 11:
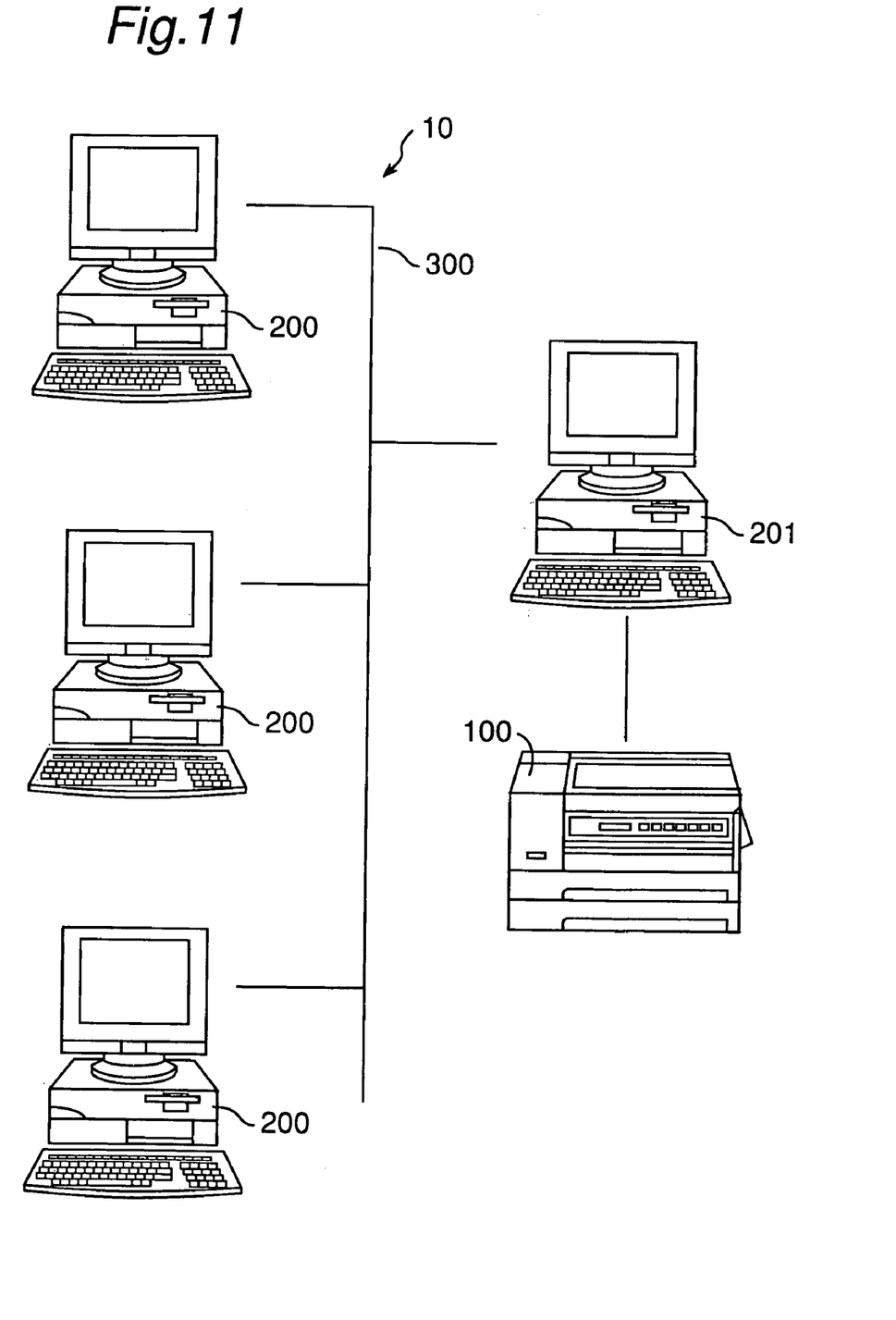
FIG. 11 shows an alternative configuration of a printing system according to the present invention.

FIG. 11 shows an alternative configuration of a printing system 10 according to the present invention. In this printing system 10 the printer 100 is connected to a printing server 201 (data processor), and the printing server 201 is connected to a plurality of host computers 200 via network 300. The host computers 200 in this system print by sending a print job signal through the printing server 201 to the printer 100.

In this alternative version of the invention the user registration means, user identification means, and messaging means can be provided in the printing server 201. More specifically, the printing server keyboard 211 is used to register in storage 213 [one or more] print job signal sender[s] and messaging information for that sender for each output destination. When a print job signal is output from any of the host computers 200, the CPU 214 of the printing server 201 detects whether the sender is registered in storage 213 as corresponding to the output destination, and if it is, presents a corresponding message on display 212.

It should be noted that the user registration means, user identification means, and messaging means are preferably provided in the printing server 201, but can be provided in each of the plurality of host computers 200.

More specifically, using the keyboard 211 of each of the host computers 200, a print job signal sender and corresponding messaging information are registered by output destination in the storage 213 of each host computer 200. When a print job signal is output from any of the host computers 200, information is relayed to the host computer 200 to which the print job signal was sent. From that information, the CPU 214 of the sending host computer detects whether a recipient corresponding to the output destination is registered in storage 213, and if it is, presents a corresponding message on the display 212 of the sending host computer 200.

The printing server 201 can also be used in the same way as the plural host computers 200 with the registration means, user identification means, and messaging means also provided in the printing server 201.

While we have described a printing system according to a first preferred embodiment of the present invention above, it will be obvious that the present invention shall not be so limited and can be varied in many ways. For example, the registration means, user identification means, and messaging means can be provided in each data processor or the printer. The process shown in FIG. 10 can also be achieved in a printing system 10 by writing this process as a computer-readable program recorded to floppy disk 400, and installing the program from floppy disk 400 to a host computer 200 or printing server 201.

Embodiment 2

Figure 12:
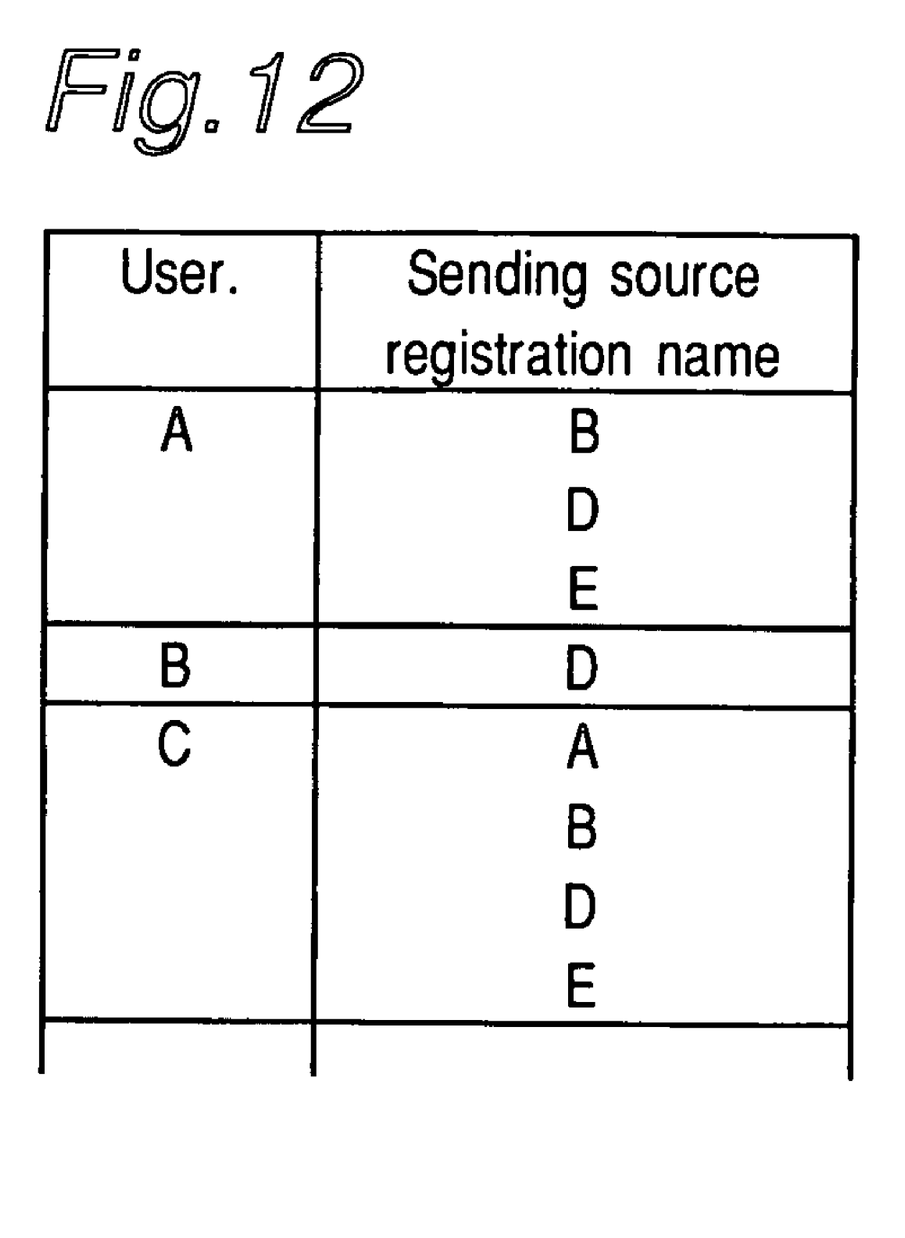
FIG. 12 shows a typical assignment of printer users authorized for printing under an assigned printer user registration name (registrant)

A printer used in this second preferred embodiment of the present invention is the same as the printer used in the first embodiment and described above with reference to FIGS. 1 to 5. It will be remembered that in the first embodiment printer users A, B, C, D, and E are assigned to bin numbers 1, 2, 3, 4, and 5, respectively, of output bins 121 of printer 100 as shown in FIG. 5. In this second embodiment, which print job signal senders are permitted to print are selected for each user as shown in FIG. 12. That is, print job signal senders B, D, and E are selected for user A, sender D is selected for user B, and senders A, B, D, and E are selected for user C. Other senders can be similarly selected for other registration names (user).

In this second embodiment of our invention, nothing is printed when a print job signal is received from a sender other than those registered as shown in FIG. 12. When a print job is received from an unregistered sender, the print job signal is stored temporarily in auxiliary storage, and a user is asked to decide whether to print or delete the job.

For example, if a print job signal is received from sender B, D, or E in the case of user A, the job is printed. However, if a print job signal is received from a sender C, for example, the job is not immediately printed and user A is notified that a job has been received from an unregistered source. Users can be notified by a messaging scheme as described in the first embodiment above.

Figure 13:
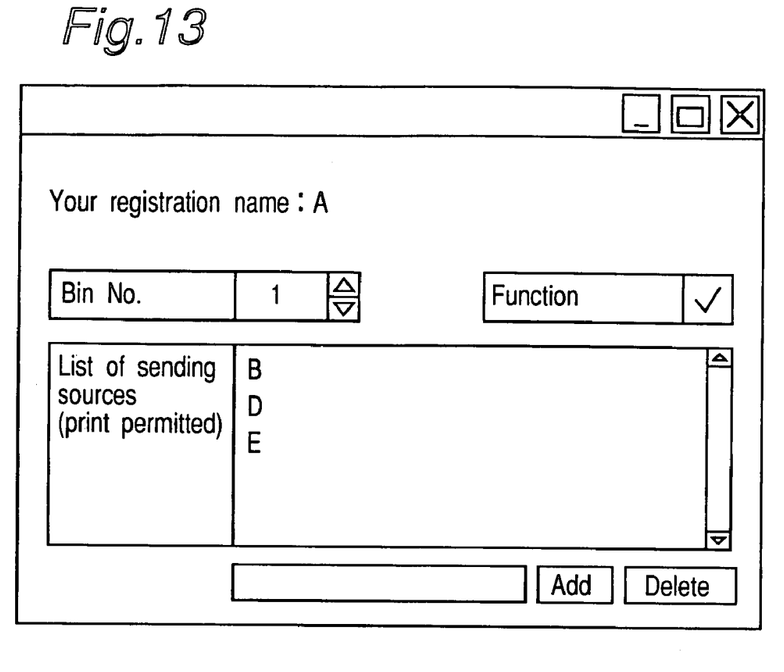
FIG. 13 shows one method for completing the setups shown in FIG. 5 and FIG. 12 on a host computer.

FIG. 13 shows a typical dialog box whereby users are assigned to a specific bin number as shown in FIG. 5, and printing is enabled for specific senders as shown in FIG. 12. Note that this dialog box is used on the host computer 200 [100, sic]. As shown in FIG. 13, the following settings are made for each user: a bin number for the output bin 121 to be used for outputting print jobs for any sender registered to that user; whether to use the function for allowing printing only by selected sender; and the senders for whom printing is allowed if the function is enabled. Note that senders can be added to and deleted from this list of sources permitted to print for a particular user.

In the example shown in FIG. 13 for user A, bin number 1 is selected, the function is enabled, and senders B, D, and E are selected in the list of sending sources that are allowed to print.

Figure 14:
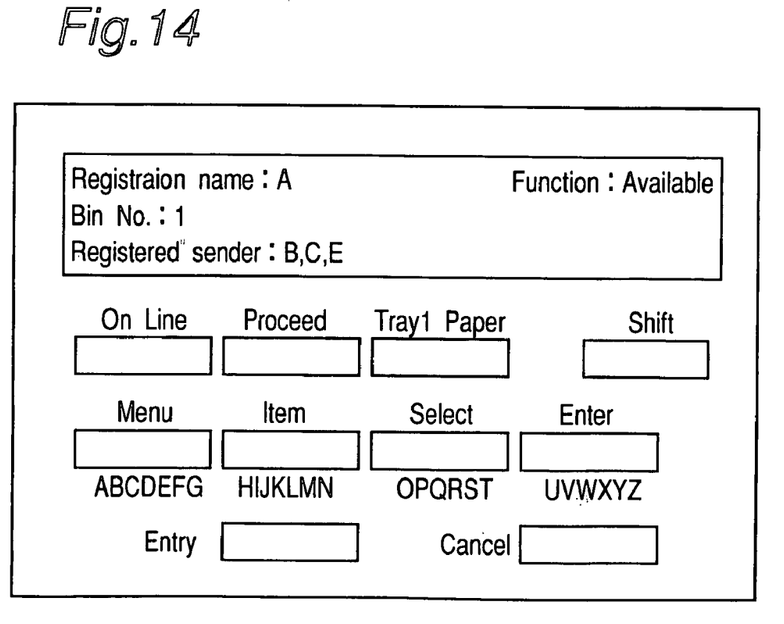
FIG. 14 shows one method for completing the setups shown in FIG. 5 and FIG. 12 on the printer.

FIG. 14 shows an exemplary operating panel 111 on the printer 100 used for assigning users A to E to output bins 121 as shown in FIG. 5, and selecting senders that are allowed to print as shown in FIG. 12. As with the example shown in FIG. 13, assigned for each particular user are: a bin number for the output bin 121 to be used; whether the function is used for that user; and the senders for whom printing is allowed if the function is enabled.

In the example shown in FIG. 14 for user A, bin number 1 is selected, the function is enabled, and senders B, C, and E are selected in the list of sending sources that are allowed to print. These settings can be made using the keys on the operating panel 111 individually or in combination.

Figure 15:
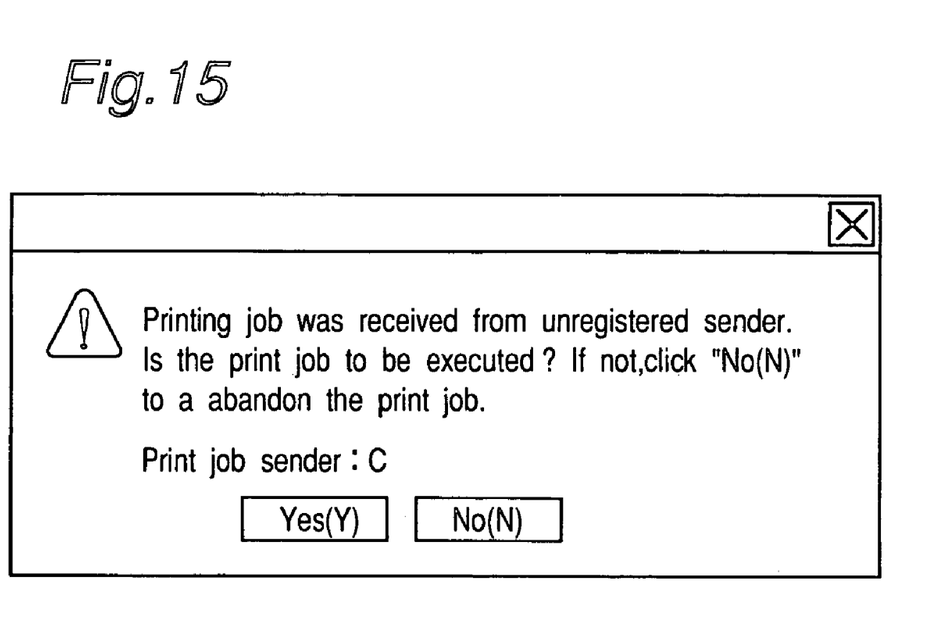
FIG. 15 shows an exemplary message presented for user input before [sic] printing in a printing system according to a second embodiment of the invention.

FIG. 15 shows a typical dialog box message presented by the printer. As shown in FIG. 15, this dialog box reports that a print job was received from an unregistered sender, and asks the user whether to print the job or throw it away. It also reports the name of the sender that sent the print job. The user is thus able to check who sent the job, and select yes or no to either print the job or throw it away. It should be noted that the print job title can be alternatively or additionally displayed. This message is also displayed on the operating panel 111 of the printer 100.

Figure 16:
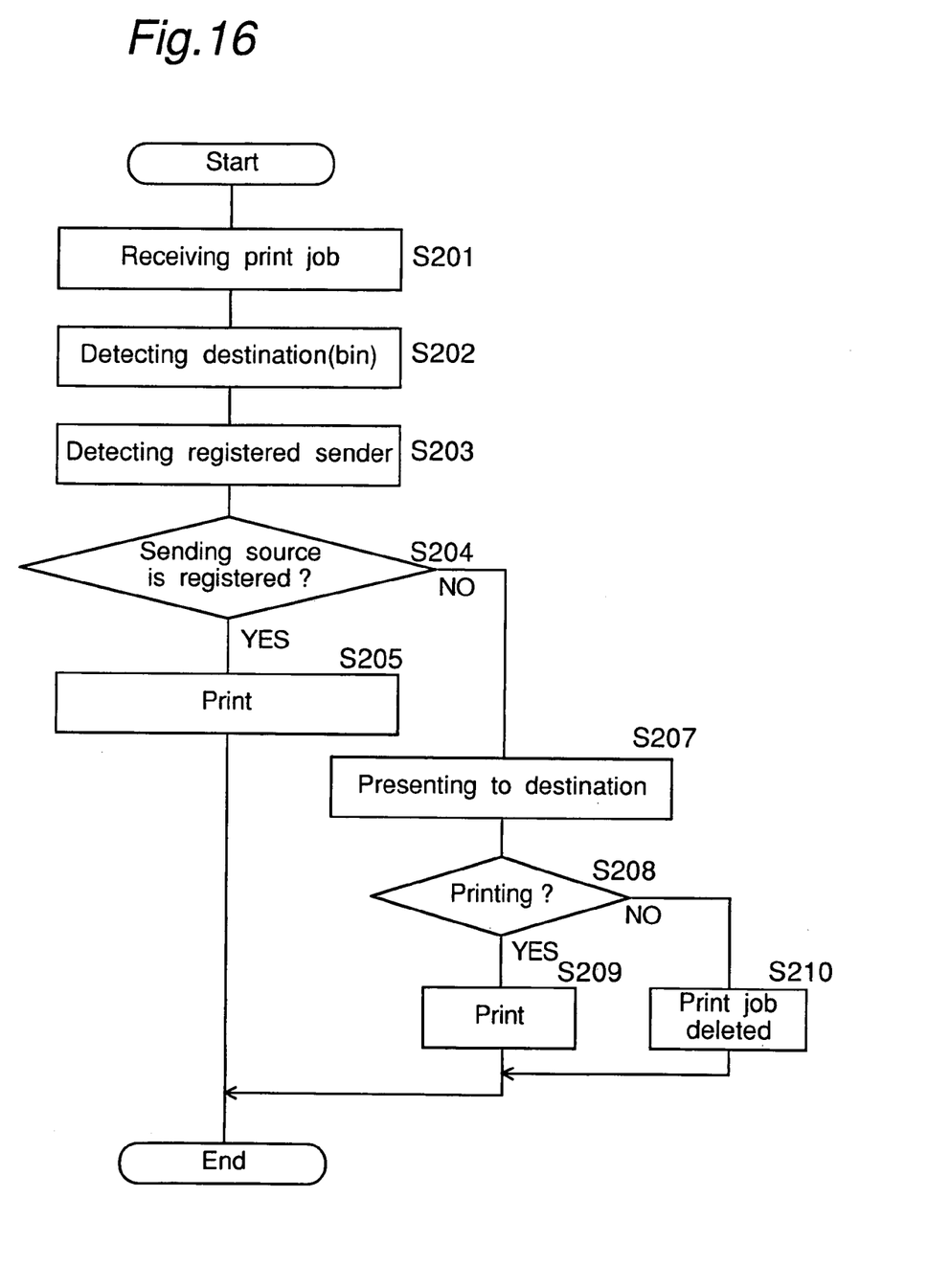
FIG. 16 is a flow chart of a printer control process according to a second embodiment of the present invention.

FIG. 16 is a flow chart of a control process performed on the printer 100. When a print job signal is sent from a host computer 200 to the printer 100, the printer 100 receives the print job signal at step S201. In addition to print data and a printer control signal, the print job signal contains information indicative of the print job signal sender, and the bin number of the output bin 121 to which the job is to be deposited.

When a print job signal is received, the printer 100 detects the destination of the print job, that is, the bin number of the output bin 121 to which the job is to be deposited, from the received print job signal (step S202).

Next, the CPU 113 of the printer 100 detects from the print job signal who sent the print job signal (step S203), and then detects whether the sender is included in the list of registered senders that are allowed to print based on the content of memory 112 and the user name, that is, the destination of the print job confirmed above (step S204).

If the print job signal sender is registered as permitted to print (step S204 returns yes), the printer 100 prints the job based on the information in the print job signal and deposits it to the specified output bin 121 (step S205).

However, if the sender is not so registered, that is, is not allowed to print (step S204 returns no), the printer 100 presents a message as shown in FIG. 15 (step S207), and waits for the user to decide whether to print or delete the print job (step S208).

If the user decides to print (step S208 returns yes), the job prints (S209) and the process then ends. If the user decides not to print (step S208 returns no), the job is deleted (S210) and the process then ends.

Figure 17:
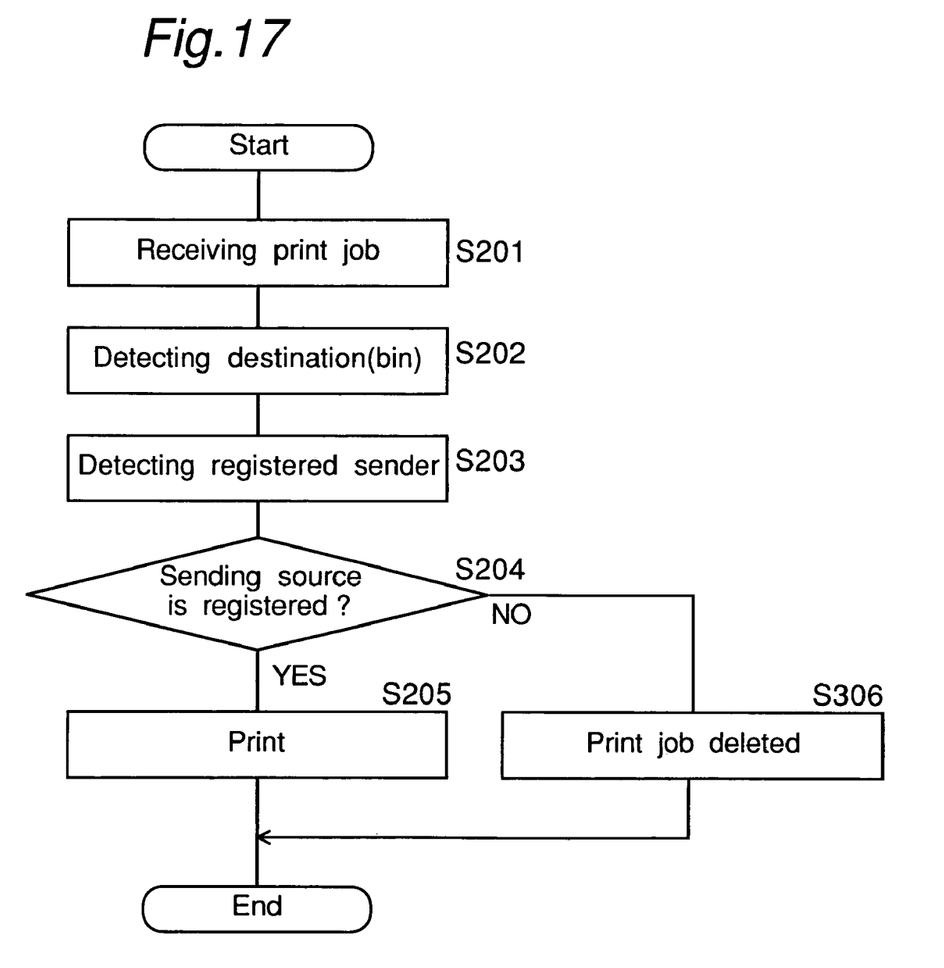
FIG. 17 is a flow chart of a printer control process according to an alternative version of a second embodiment of the present invention.

FIG. 17 shows an alternative version of the present embodiment. In this version print jobs are deleted automatically without waiting for user intervention when a print job signal is received from an unregistered sender. As shown in FIG. 17, steps S207 to S210 of FIG. 16 are replaced by a single step S306. More specifically, step S204 detects whether the print job signal sender is registered as allowed to print. If the sender is allowed to print (step S204 returns yes), the job is printed and the process ends as above. However, if the sender is not allowed to print (step S204 returns no), the job is immediately deleted (step S306), and the process then ends.

This second embodiment of the invention can also be achieved using a printing system 10 as shown in FIG. 12. In this case, the user registration means, user identification means, print job deleting means, print job storing means, and messaging means can be provided in the printing server 201. More specifically, the printing server keyboard 211 is used to register in storage 213 for each output destination what print job signal senders are allowed to print. When a print job signal is output from any host computer 200, the CPU 214 of the printing server 201 detects whether a sender corresponding to the output destination is registered in storage 213, and if it is, prints to the printer 100 based on the received print job signal.

However, if the user that sent the print job is not registered, a message is presented on the display 212 of the printing server 201, and the user is asked whether to print or delete the job. If the user selects to print, the job is printed. If the user selects not to print, the CPU 214 of the printing server 201 deletes the print job.

It should be noted that the user registration means, user identification means, print job deleting means, print job storing means, and messaging means are provided in the printing server 201 above, but the user registration means, user identification means, and messaging means can be provided in each of the plurality of host computers 200.

That is, which users are allowed to print is registered for each output destination in the storage 213 of each host computer 200 using the keyboard 211 of each of the plural host computers 200. When a print job signal is output from one of the host computers 200, information is relayed to the host computer 200 to which the print job signal was sent (the host computer 200 corresponding to the output destination).

From that information, the CPU 214 of the sending host computer detects whether a recipient corresponding to the output destination is registered in storage 213.

If it is, the print job is printed on the printer 100 based on the print job signal.

If the recipient is not registered, a message is presented on the display 212 of the sending host computer 200 to ask the user whether to print or delete the job. If the user selects to print, the job is printed. If the user selects not to print, the CPU 214 of the host computer 200 deletes the print job.

The printing server 201 can also be used in the same way as the plural host computers 200 with the user registration means, user identification means, print job deleting means, print job storing means, and messaging means provided in the printing server 201.

While we have described a printing system according to a second preferred embodiment of the present invention above, it will be obvious that the present invention shall not be so limited and can be varied in many ways. For example, the user registration means, user identification means, print job deleting means, print job storing means, and messaging means can be provided in each data processor or the printer. The process shown in FIG. 16 or FIG. 17 can also be achieved in a printing system 10 by writing this process as a computer-readable program recorded to floppy disk 400, and installing the program from floppy disk 400 to a host computer 200 or printing server 201.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer comprising:
   a receiving unit for receiving a print job to which information of a sending source is added;
   a printing unit for printing according to said print job received by the receiving unit;
   a memory for storing the sending source of a print job sent from a data processing device, and a message corresponding to the sending source;
   a controller for detecting a sending source corresponding to an output destination based on the information of the print job sent from the data processing device, and detecting whether the sending source has been registered in the memory; and
   a messaging unit for outputting the message corresponding to the sending source when the controller detects that the sending source has been stored.

2. A printer according claim 1, further comprising a plurality of output bins assigned to a plurality of users, wherein:
   said memory registers for each user a sending source and message corresponding to said sending source;
   said printing unit outputs a print-out to an output bin assigned to a user indicated by output destination information for a received print job; and
   said controller detects whether the sending source of the received print job has been registered in the memory as a sending source for the user indicated by the output destination information of the received print job.

3. A printing system comprising:
   a plurality of data processing devices;
   a printer for printing based on a print job sent from a data processing device, said print job containing information indicative of a sending source and output destination;
   memory for registering the sending source contained in the print job, and a message corresponding to said sending source;
   a controller for detecting the source corresponding to the output destination based on the print job sent from the data processing device, and detecting whether said sending source has been registered source memory; and
   a messaging unit outputting the message corresponding to the sending source when the sending source has been registered.

4. A printing system according to claim 3, wherein said memory is disposed in said printer.

5. A printing system according to claim 3, wherein said memory is disposed in said data processing device.

6. A printing system as described in claim 3, wherein said controller is disposed in said printer.

7. A printing system according to claim 3, wherein said controller is disposed in said data processing device.

8. A printing system according to claim 3, wherein said messaging unit is disposed in said printer.

9. A printing system according to claim 3, wherein said messaging unit is disposed in said data processing device.

10. A printing system according to claim 3, wherein said printer further comprises a plurality of output bins assigned to a plurality of users, wherein:
    said memory registers for each user the sending source and message corresponding to said sending source have been registered on the memory for each user;
    said printing unit outputs a print-out to an output bin assigned to a user indicated by output destination information for a received print job; and
    said controller detects whether the sending source of the received print job has been registered in the memory as a sending source for the user indicated by the output destination information of the received print job.

11. The printer according to claim 1, wherein said message unit comprises a display panel provided on the printer to cause the display panel to display the message.

* * * * *